Figure 3:
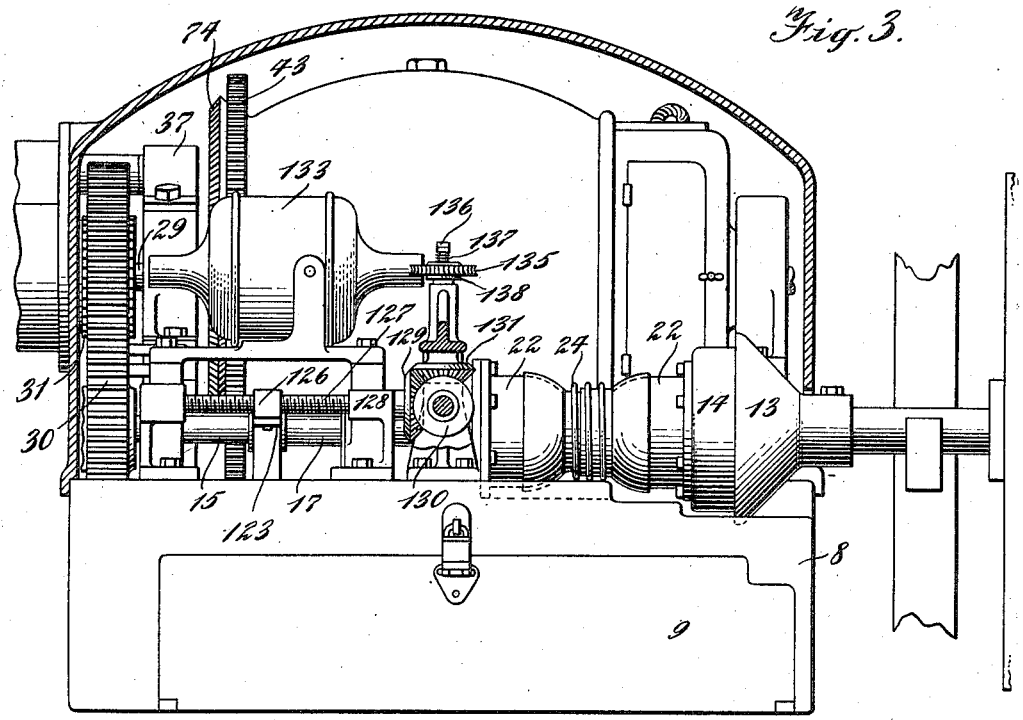

G. S. WILLIAMSON & C. E. MANDELICK.
TENSION APPARATUS.
APPLICATION FILED AUG. 5, 1911.
1,160,556.
Patented Nov. 16, 1915.
6 SHEETS—SHEET 1.
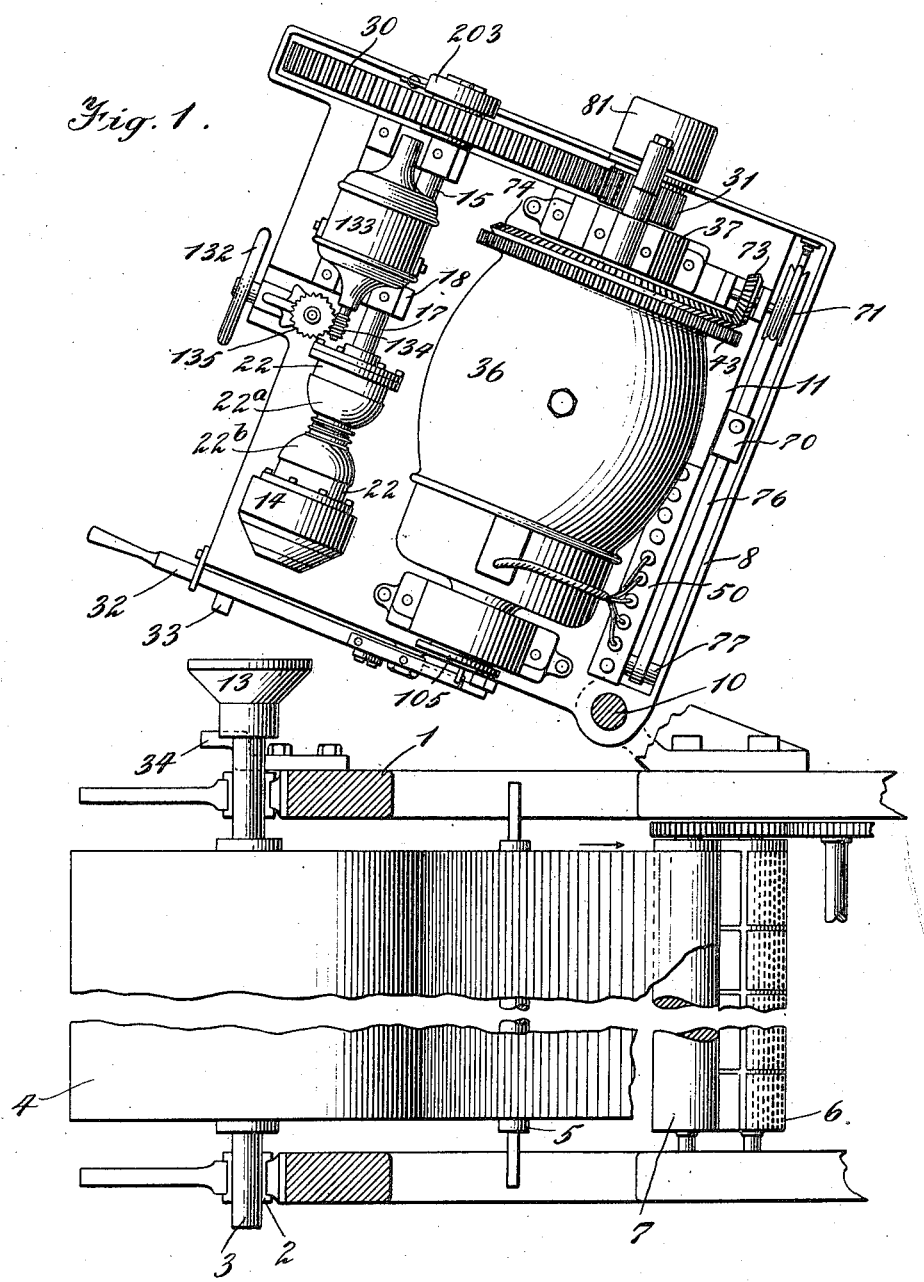

G. S. WILLIAMSON & C. E. MANDELICK.
TENSION APPARATUS.
APPLICATION FILED AUG. 5, 1911.
1,160,556.
Patented Nov. 16, 1915.
6 SHEETS—SHEET 2.
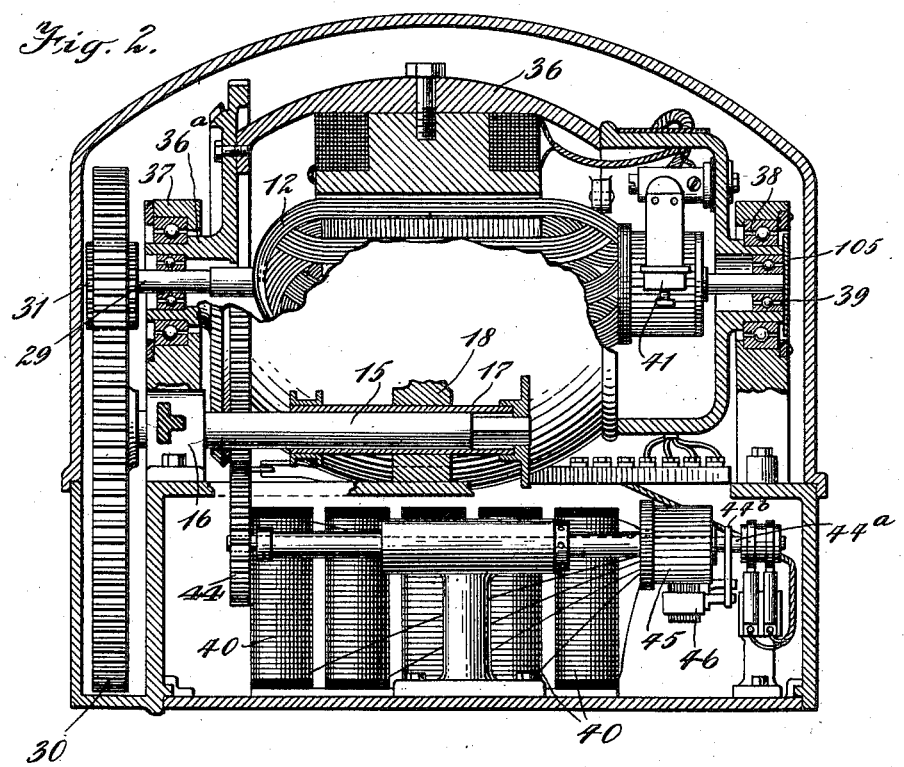
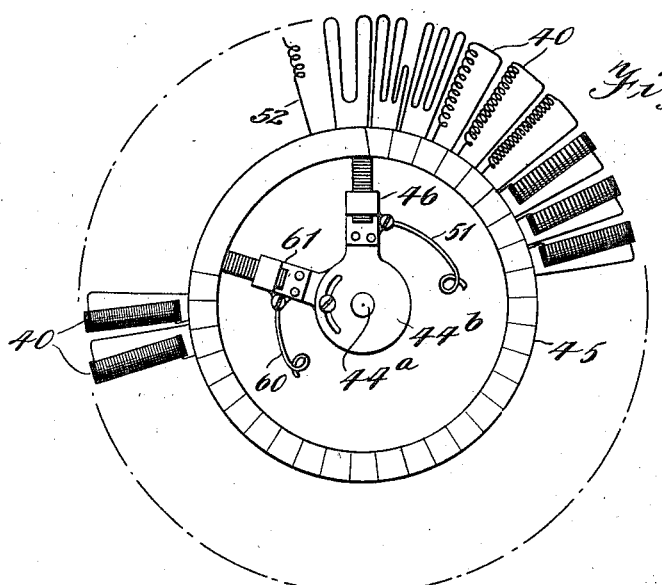

G. S. WILLIAMSON & C. E. MANDELICK.
TENSION APPARATUS.
APPLICATION FILED AUG. 5, 1911.

1,160,556.

Patented Nov. 16, 1915.
6 SHEETS—SHEET 3.

G. S. WILLIAMSON & C. E. MANDELICK.
TENSION APPARATUS.
APPLICATION FILED AUG. 5, 1911.
1,160,556.
Patented Nov. 16, 1915.
6 SHEETS—SHEET 4.
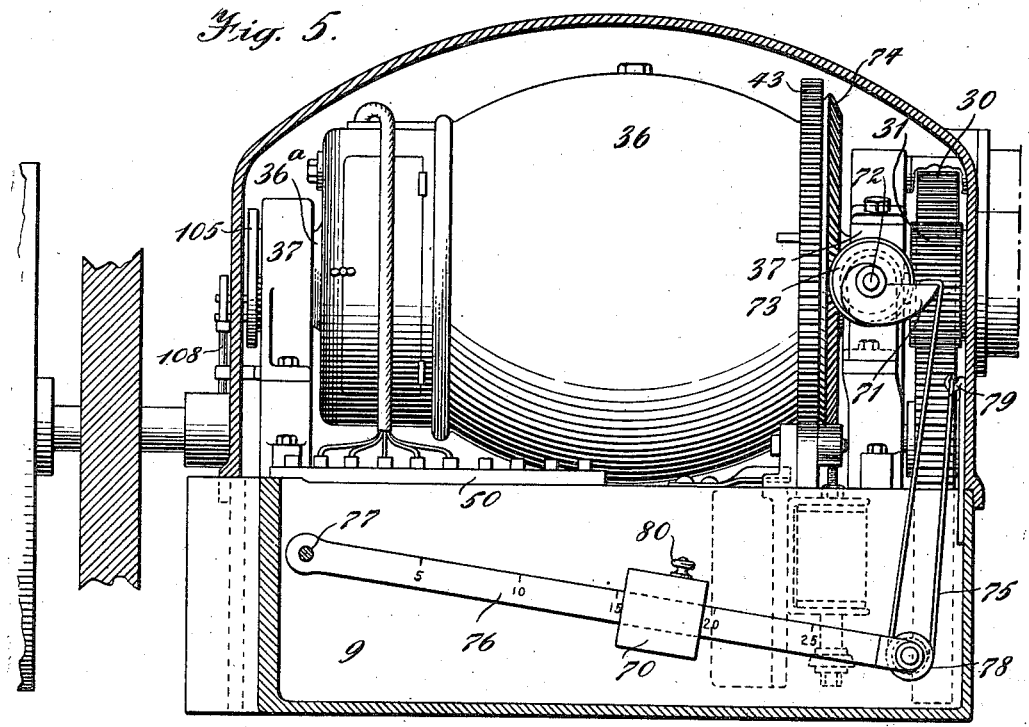
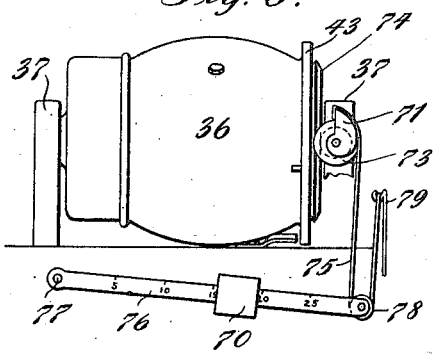
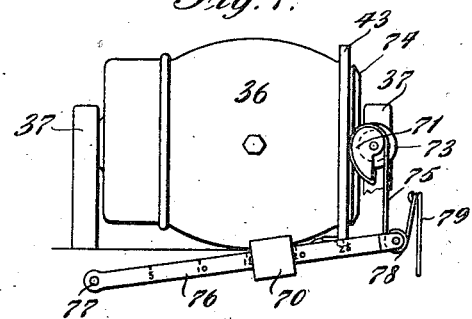
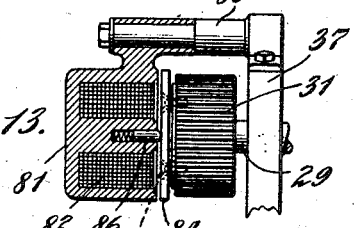

G. S. WILLIAMSON & C. E. MANDELICK.
TENSION APPARATUS.
APPLICATION FILED AUG. 5, 1911.

1,160,556.

Patented Nov. 16, 1915.

Witnesses:

Inventors
Glenn S. Williamson
Charles E. Mandelick

G. S. WILLIAMSON & C. E. MANDELICK.
TENSION APPARATUS.
APPLICATION FILED AUG. 5, 1911.
1,160,556.
Patented Nov. 16, 1915.
6 SHEETS—SHEET 6.
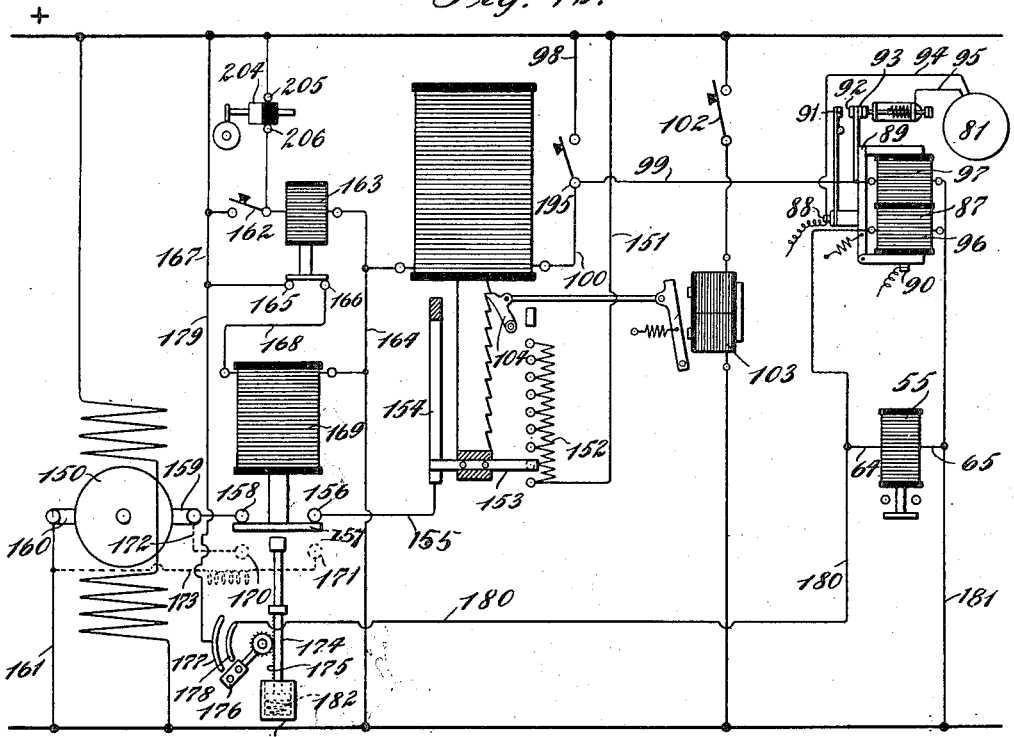
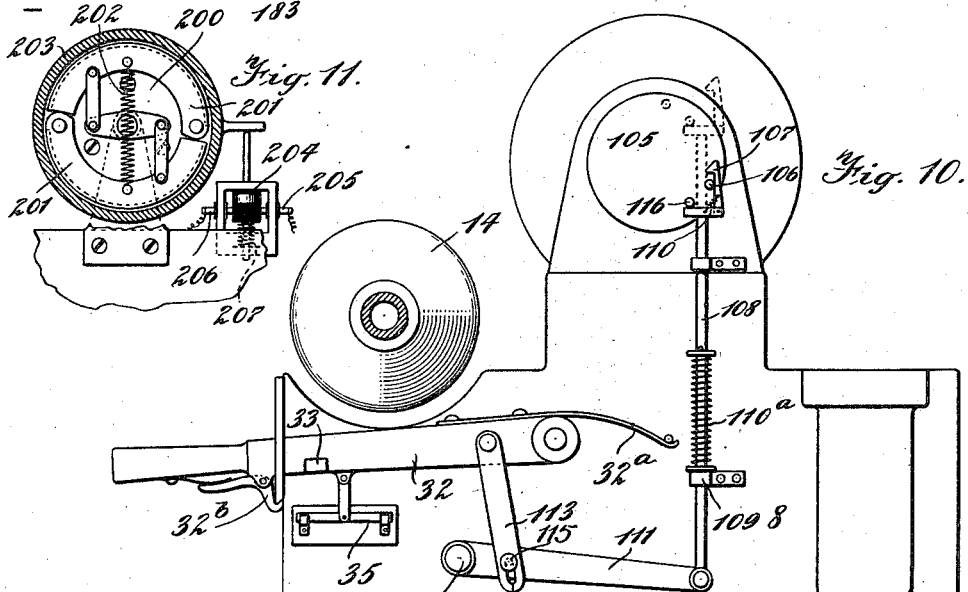

UNITED STATES PATENT OFFICE.

GLENN S. WILLIAMSON, OF NEW YORK, N. Y., AND CHARLES E. MANDELICK, OF RIDGEFIELD PARK, NEW JERSEY.

TENSION APPARATUS.

1,160,556.  Specification of Letters Patent.  Patented Nov. 16, 1915.

Application filed August 5, 1911. Serial No. 642,544.

*To all whom it may concern:*

Be it known that we, GLENN S. WILLIAMSON and CHARLES E. MANDELICK, citizens of the United States, and residents, respectively, of New York, borough of Manhattan, county and State of New York, and Ridgefield Park, county of Bergen, State of New Jersey, have invented certain new and useful Improvements in Tension Apparatus, of which the following is a specification.

This invention relates to means for controlling the tension of material in winding or unwinding, involving rolls or reels the diameter of which varies as the material is wound or unwound.

The invention as illustrated is shown as applied more particularly for the control of the tension of the paper drawn from its roll by a rotary web printing press. In such printing presses it is of great importance that the roll be at all times prevented from overrunning. The danger of this exists particularly when the roll is new, since at this time its weight and consequently its inertia is large, and at the same time the leverage exerted by the traveling web to turn the roll is maximum. At the outset, with a new roll, the braking effect must be considerable. As the roll diminishes in size and the leverage of the traveling web grows smaller, the braking effect, if kept uniform would apply increasing tension to the web, so that rupture of the web would be likely to occur. For this reason, and because it is generally desirable for the operation of the press, the attempt has been to keep a substantially uniform tension on the web throughout the unwinding of the roll. The means heretofore practically employed has been a hand-operated friction brake. This means has proved only partially satisfactory.

The object of this invention is to provide a thoroughly practical automatic apparatus for maintaining a uniform tension on the web while the latter is traveling into the press at normal lineal speed.

A further object is to cause the braking effect to be developed after the roll is first placed in motion, so that the resistance of the brake is not added, at the very outset, to the resistance of inertia, and to cause the braking effect to increase automatically to a maximum coincident with the arrival of the web at normal lineal speed, after which the braking effect is diminished as the roll diminishes in size.

A further object is to cause the braking effect to be again increased when the press and the roll die down, at which time the roll would otherwise outrun the press.

A further object is to enable the accomplishment of all these results by a single means under the control of the angular velocity of the roll.

A further object is to provide automatic means for preventing the braking means from returning to normal starting condition upon stopping the roll after the attainment of a predetermined angular velocity; so that in starting up again with a small or almost exhausted roll, and with consequent small leverage, the maximum braking effect will not be developed and instead the braking resistance will increase to a quantity suitable to the size of the roll, thus preventing undue tension on the web.

A further object is to cause an emergency braking effect to be produced, preferably by the same braking means in event of an emergency or sudden stop of the press.

To accomplish these ends we employ means, including a braking electric generator driven by the roll-support, whereby the braking effect offered to the turning of the roll is controlled automatically, during running at normal lineal speed of the web, at starting, and at stopping. Preferably the instrumentalities for varying the braking effect of the generator are controlled by the angular velocity of the roll; so that, maximum braking is attained at or about the same time that the lineal speed of the web arrives at maximum, and thereafter the increasing angular velocity of the roll, corresponding to the decreasing size thereof, causes these instrumentalities to decrease the braking effect to minimum with minimum size of the roll. An advantage of this is that as the velocity of the roll dies down to the lower speeds, due to the slowing down of the press, the braking effect is again increased, although the size of the roll is still decreasing, thus opposing the tendency of the roll to outrun the press at such times. In the best embodiment of the invention, the generator is driven by the roll through a rotatable support therefor to which the armature of the generator is connected.

Preferably, the support to which the generator is connected is a spindle or axial support. The generator may be directly connected to the support, or it may be geared thereto.

The most preferable embodiment of means for placing the variation of the braking effect under the control of the angular velocity of the rolls, includes a floating or rotatable field or other magnetic member moved by the torque of the armature. In its rotation under the torque of the armature this floating magnetic member operates or controls instrumentalities to reduce the braking effect of the generator on the paper roll. This is best accomplished by providing a rheostat or variable resistance which is placed so as to be controlled by the floating magnetic member, though it will be obvious that other forms of impedance may be employed. As the floating member rotates under the torque of the armature it operates to cut in or to cut out more of the resistance, as the nature of the wiring may be, to cause the current generated by the dynamo to decrease as the speed of the armature increases. The most direct, but not the only way of accomplishing this is to place variable resistance in series with the armature and to provide mechanical means whereby the field-frame progressively cuts more resistance into series with the armature as the speed of the latter increases.

In order to enable the floating member to be progressively rotated under the diminishing torque of the armature, we provide means for resisting the turning of the member, which means has an automatically decreasing effect as the member turns. A desirable form of such means is a mechanical resistance, and a simple form of mechanical resistance is a weight and connections between the weight and the floating member whereby the moment of the weight decreases as the rotation of the member progresses. For lessening the moment of the weight we prefer to employ a cam whereby the leverage of the weight is reduced. This means for exerting diminishing resistance to the turning of the floating member also operates to restore the field-frame to normal position upon stopping of the roll; so that when the press is started up again with the same, or with a new roll, the braking effect goes through the same cycle as before. In event, however, that the press has been stopped with a roll of less than a predetermined size, it will be undesirable to have the braking effect increased to maximum after again starting, since the leverage of the web to turn the roll under such conditions is small. For this purpose we provide means for locking the field-frame or other floating magnetic member against return to normal position after having been rotated to a predetermined degree under the torque of the armature; in other words, after the angular velocity, and therefore the diameter, of the roll has reached a predetermined value. A latch or other suitable means may coöperate with the field-frame for this purpose. When a small roll is again started after the latch has come into operation, the braking effect will not go through the complete cycle, but will increase up to the degree determined by the position of the latch. It is desirable, however, to provide means whereby this latch is prevented from holding the field-frame at the predetermined degree of rotation, when the press is started up with a new, large roll placed on the bearings. To this end, we prefer to employ means whereby the insertion of a new roll necessitates the releasing of the latch so that the field-frame may be returned to normal position. We also provide means, which may be embodied in the same mechanism as the preceding means, whereby the insertion of a new roll causes the positive return of the field-frame irrespective of the action of the weight.

In order to assist the braking effect of the generator to stop the roll upon either a gradual stop or an emergency stop of the press, we employ an electric magnetic brake, which is energized by the act of stopping the press. Preferably the coils of this brake are supplied with current from the armature of the braking generator. The brake may coöperate with the rotatable support of the roll or with any moving part connected therewith.

In order to increase the braking effect materially in case of the emergency stop of the press, we provide means for cutting out a considerable part of the resistance in series with the armature and simultaneously locking the field frame against rotation, this means being automatically controlled by the emergency means for stopping the press. The result of so cutting out several sections of the resistance and locking the field-frame is to cause a sudden increase in the strength of the current, so that an increased braking action is secured. This sudden increase in the braking current not only causes the braking generator to act as a dynamic brake but also causes an abnormally strong current to flow through the coils of the magnetic brake, which is supplied from the armature of the generator and which is caused to be energized through the emergency stopping of the press.

It is obvious that the strength of the braking current generated by the dynamo, and therefore the magnitude of the braking effect of the generator on the paper roll, is dependent directly upon the value of the resistance elements associated with the armature circuit and the formation of the cam whereby the moment of the force opposing the rotation of the field-frame is opposed with diminishing effect. We prefer to utilize resistance elements having varying values, increasing from a small degree of resistance for those first cut in to a high degree of resistance for those last cut in. The resistance elements first included in the circuit are of too low a value to prevent the current increasing in strength up to that generated by the normal speed of the press, but thereafter the elements cut in are of sufficient values to cause the current to be progressively diminished.

A desirable feature of the invention is the production of means whereby the press is automatically stopped when the roll has attained a predetermined velocity corresponding to the close approach of the exhaustion of the web wound thereon.

A further object of the invention is to embody the various instrumentalities in an assemblage which occupies comparatively little space, in the most convenient location, and which may be applied to and removed from the roll or its support in the simplest manner, without complicating the operation of inserting a new roll.

A further object of the invention is to provide a novel means or margin-regulating device, whereby the roll may be adjusted sidewise in a much more delicate manner than heretofore to keep the web running true.

Having thus briefly described the nature of our invention we will now proceed to a specific consideration of those embodiments of the various instrumentalities which experience has shown to be the best suited for the purposes in view, it being understood, however, that numerous other embodiments within the scope of the invention are possible.

Figure 4:
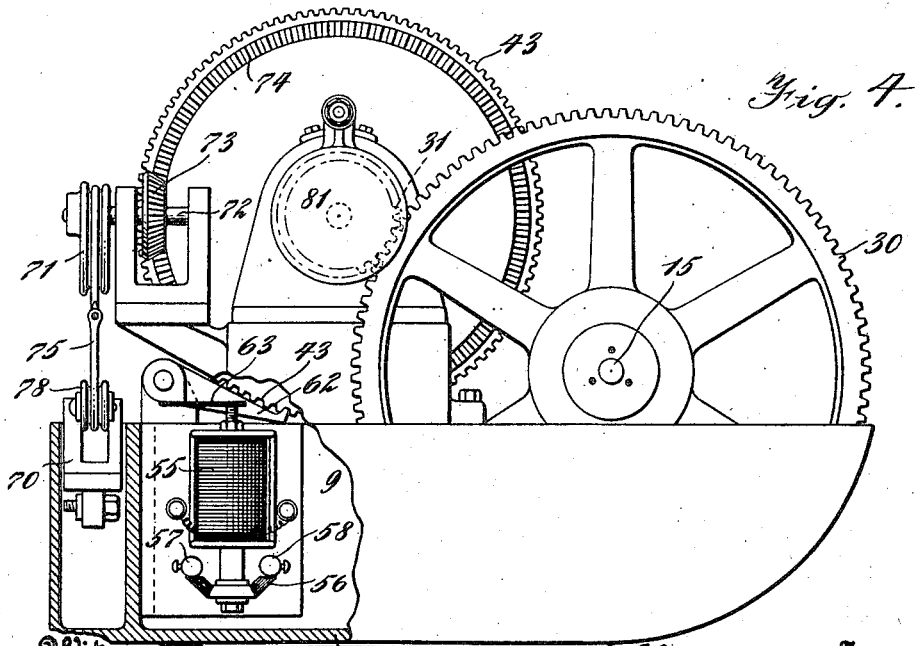
Figure 8:
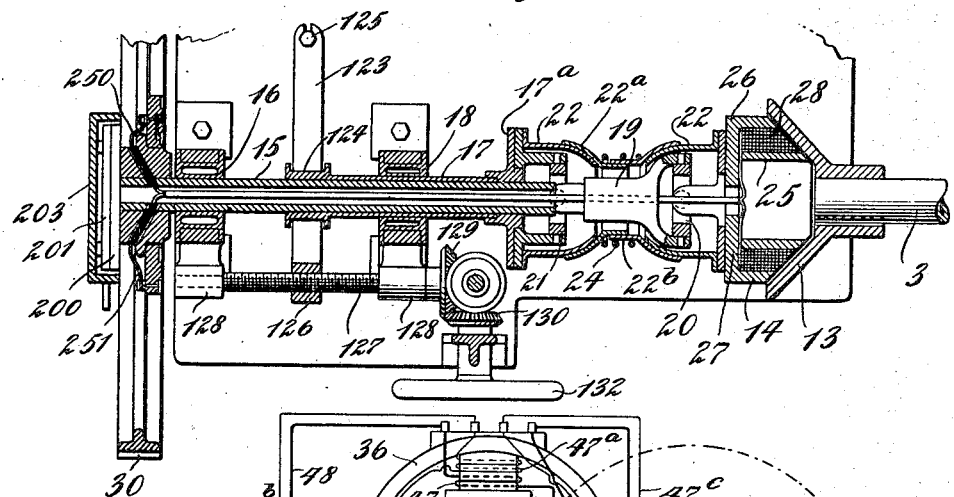
Figure 9:
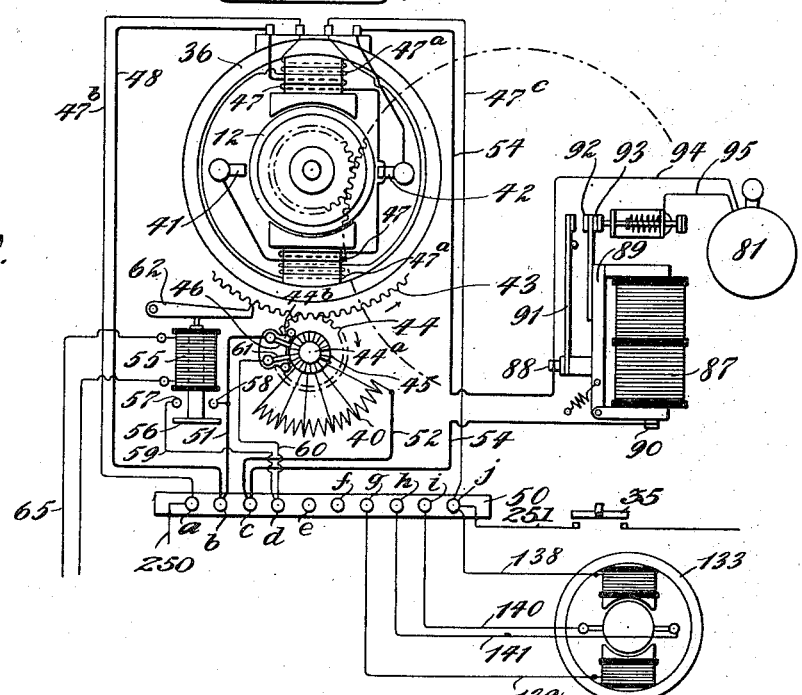
Figure 9A:
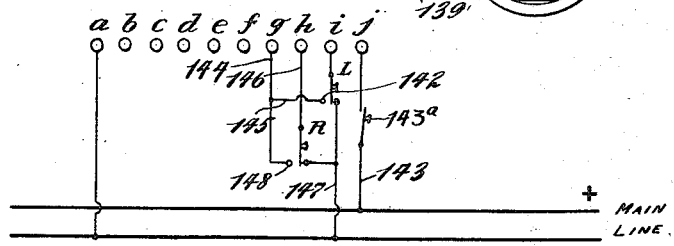

In the accompanying views we illustrate the preferred form of the invention; and in these views:

Figure 1 is a plan view, showing part of the press frame and parts, broken away for economy and space, and the brake apparatus swung away from the press frame; Fig. 2 is a transverse section through the brake apparatus, part of the section being through the generator, and part in a different plane at the region of the shaft that is coupled with the roll spindle; Fig. 3 is a front view of the brake apparatus; Fig. 4 is a side view thereof, parts being broken away; Fig. 5 is a rear view thereof; Figs. 6 and 7 are views on a smaller scale, corresponding to the last, showing parts in changed positions; Fig. 8 is a sectional view in the plane of the shaft that is coupled to the roll spindle; Fig. 9 and Fig. 9ª are diagrammatic views showing wiring; Fig. 10 is a view of the opposite side of the apparatus from that shown in Fig. 4; Fig. 11 is a detail section showing the centrifugal means for controlling the electromagnetic stopping brake; Fig. 12 is a diagram of wiring; Fig. 13 is a detail section of the electromagnetic stopping brake; and Fig. 14 is a semi-diagrammatic view, showing a form of variable resistance with commutator and brushes that may be employed.

The numeral 1, referring more particularly to Figs. 1 and 2, indicates the framework of a rotary web printing press; 2 are the usual open bearings for the spindle 3 of the paper roll 4; 5 is the spring-pressed guiding roll over which the web passes from the roll; and 6 and 7 are the type roll and blanket roll, respectively, by which the paper is drawn into the press, though special feeding-in rolls may be employed.

In accordance with our invention we dispose the braking apparatus at the side of the press opposite the paper roll, and mounted as a unit so that it may be swung laterally toward and from the press, into and out of coupled relation with the spindle 3. To this end we provide a suitable support or frame-work 8, on which the parts are mounted, and the lower part of which may constitute a drawer or casing 9 for the reception of certain parts. This supporting structure is connected with the frame-work of the press by means of a hinged joint 10.

The braking generator is indicated as a whole by the numeral 11. The armature 12 of this generator is connected with the rotary support for the paper roll by means other than the web, so as to be driven at constant speed ratio to the roll. The armature is connected with the axial roll support through the instrumentality of a clutch. We prefer to gear the armature to the roll-spindle and interpose a magnetic clutch between the spindle and the gearing. In the particular and desirable construction illustrated the spindle is provided at its end adjacent the braking mechanism with a hollow, conical clutch member or armature 13. An electro-magnetic clutch member 14 is rotatably mounted on the support 8, and together with the member 13 constitutes means for coupling the spindle 3 with the shaft 15. Details of construction, which are regarded as novel and desirable, will be understood by reference to Fig. 8.

The shaft 15, preferably a tubular member, is mounted in the bearing 16 on the support 8. It is received within a sleeve or telescopic shaft section 17, the parts 15 and 17 having suitable engagement with each other so that they are caused to rotate together, though the sleeve 17 may slide on the shaft 15. The sleeve 17 turns in the bearing 18. In fact, the parts 15 and 17 constitute a telescopic shaft journaled in bearings 16 and 18. The electro-magnetic clutch member 14 is connected with the sleeve 17 by means of a shaft section 19 and two universal joints 20 and 21. In this way the compound shaft 15, 17 may be driven without wabbling from the spindle 3, even though the shaft and spindle may not be in longitudinal alinement.

Between the flange 17$^a$ on the end of the sleeve 17 and the back of the clutch member 14 we may interpose a casing for inclosing the universal joints 20 and 21 and conforming to the angular movements of the jointed shafting. This casing may be filled with grease. In the particular construction shown, two partially spherical sections 22 are secured to the flange 17$^a$ and the magnetic clutch member respectively. At their inner ends these sections have universal movement in spherical flanges 22$^a$ on the ends of a telescopic collar 22$^b$, constituting the middle section of the casing. A spring 24 is interposed between the sections of the collar 22$^b$, so as to force them apart, and to tend to hold the clutch member 14 in alinement with its shaft.

The magnetic clutch member 14 is in the nature of a cup with inner and outer iron walls 25, 26, connected with their bottoms by the iron back 27; the coils 28 being wound in the annular slot between the walls. The face of the member is beveled off to form a truncated cone to fit the interior of the soft iron clutch member 13.

The shaft 15 is connected with the armature shaft 29 preferably by means of a multiplying gearing, shown as consisting of a large gear 30 on the end of the shaft 15 and a pinion 31 on the end of the armature shaft.

Means are provided for locking the support 8 to the frame of the press, a suitable embodiment of which is the locking lever 32, having the piece 33 which takes over the keeper 34 secured to the side of the press frame. The lever 32 also constitutes a handle by means of which the brake apparatus may be swung as a unit away from the press. Means are provided whereby movement of the lever 32 to unlock the support 8 from the press frame also deënergizes the electro-magnetic clutch member 14. It is obvious that this may be accomplished in a variety of ways. In Fig. 10 we have shown a switch 35 which is connected with the lever 32 so as to be thrown open by the movement of the lever to unlock, and to be closed by the movement of the lever in locking again. The clutch coils are shown as connected with wires 250 and 251, which may lead from terminals $a$ and $j$ on the terminal block 50 (see Figs. 9 and 9$^a$) to supply the coils with current. The lever 32 and the switch may be thrown open quickly by a spring 32$^a$, and a latch 32$^b$ may hold the locking lever closed.

The field frame 36 of the generator is mounted rotatably. A convenient construction is shown in Fig. 2, wherein the journal extensions 36$^a$ of the field-frame turn in external bearings, and the journal portions of the armature shaft turn inside the journal extensions of the field-frame. Ball bearings 38 and 39 may be employed to reduce friction.

The field magnets of the generator are energized preferably by compound windings; there being windings 47 in series with the armature, and windings 47$^a$ supplied from an outside source, as shown in Fig. 9. The coils 47$^a$ are supplied with current from an outside circuit through terminals $a$ and $j$ on the terminal block 50, and wires 47$^b$ and 47$^c$. This form of winding enables the generator to produce an adequate braking current at the slow speed subsequent to starting.

In accordance with the invention means are provided whereby rotation of the field-frame 36 under the torque of the armature of the generator reduces the braking effect as the speed of the armature of the generator increases. In the particular embodiment of the invention illustrated the rheostat 40 is controlled by the field-frame, to place more or less resistance in series with the armature brushes 41 and 42, which are mounted on the field-frame so as to rotate therewith. Various means may be employed to this end. We prefer to mount a large gear segment 43 on the field-frame, meshing with which is a pinion 44, to the shaft 44$^a$ of which is secured a support 44$^b$ carrying a brush 46, which is thereby rotated about a stationary commutator 45. This brush is connected with the armature brush 41. The circuit may be traced in Fig. 9 from the brush 41, through the series coils 47 of the field poles along wire 48 to the terminal $b$ on a suitable terminal block 50, thence by wire 51 to the rheostat brush 46, thence through the commutator segment and as many resistance coils as are included in circuit, to the wire 52 leading from the rheostat to the terminal $c$ on the block, and from thence by wire 54 to the other armature brush 42. The parts are so arranged and related that the field-frame turns under the torque of the armature of the generator which operates the rheostat to cut progressively more resistance into the armature circuit, thus diminishing the strength of the braking current generated by the armature rotating at increasing speed. Normally, that is, at starting, as indicated in Fig. 14, the brush 46 is positioned so that few or none of the resistance elements are in circuit. The resistance elements first cut in are of low resistance, and the resistance of the several elements preferably increases in the order in which they are cut into the circuit as the commutator revolves. Thus, as the brush 46 is rotated by the field-frame, more resistance elements are constantly included in the armature circuit and each resistance element is preferably of greater value than the one preceding it.

Fig. 14 indicates a practical construction of the rheostat. Here the starting commutator segment is shown long, so that both the brush 46 and the brush 61 (presently to be described) may rest thereon. This view indicates that the resistance elements increase in value.

In accordance with the invention means are provided for offering diminishing opposition to the turning of the field-frame under the torque of the armature as the unwinding of the paper roll proceeds, and for automatically turning the field-frame backward and thereby cutting out resistance when the web roll stops or slows down. Preferably, mechanical means are employed for this purpose. In the particular construction illustrated a weight 70 is utilized, and its leverage to turn the field-frame backward is progressively diminished by means of a cam 71. As shown more particularly in Figs. 5 to 7, the cam 71 is mounted on a shaft 72, on which is a beveled pinion 73 meshing with a beveled gear 74 on the field-frame; so that the cam is rotated at increased speed by the rotation of the field-frame. The weight 70 is connected with the cam by means of a cord or other flexible connector 75, which is wrapped upon the surface of the cam as the cam turns. Preferably, the weight 70 is mounted slidably on an arm 76, which is pivoted at one end as at 77 and has a pulley 78 at its other end over which the cord 75 is passed. The other end of the flexible connector 75 is secured to a suitable stationary support, as indicated at 79. Adjustment of the tension placed upon the paper web may be secured by sliding the weight 70 upon its arms, suitable means as indicated at 80 being provided for securing the weight at any point of adjustment thereon.

Means are provided whereby the generator may be caused to act as a dynamic brake to secure a prompt stopping of the paper roll. This means is preferably controlled by the emergency means, or "red push button," for stopping the press. This means operates to cut out a material amount of the resistance 40 which happens to be in circuit with the armature of the generator, so that the generator produces a suddenly increased current. At the same time the field-frame is locked against further rotation. In the particular construction illustrated a solenoid 55 is provided with a contact 56 on its core arranged to bridge two contacts 57 and 58. Contact 57 is connected by wires 59 and 60 and the terminal $d$ on the terminal block with an extra brush 61 bearing on the commutator 45 and carried by the same support 44$^b$ as the brush 46, both brushes being insulated from their support. The contact 58 is connected with the wire 51 leading from the contact $b$ on the terminal block. When the solenoid is energized to bridge the contacts 57 and 58, the armature current passes from the wire 48 and the wire 51 to the contact 58, thence to contact 57, along the wire 59 to terminal $d$ on the terminal block, thence by wire 60 to brush 61, through the resistance elements in rear of this brush to wire 52, and thence back to the armature, as before. In this way, the resistance coils or sections included between the brushes are in effect cut out. Thus, a materially larger current is generated by the armature, and a correspondingly greater braking resistance is offered to the turning of the paper roll. Simultaneously with this cutting out of resistance from the armature circuit, the field-frame is locked against rotation, thereby locking the brushes 46 and 61 in relation to the commutator 45. To this end we have shown a catch 62, which is swung by the core of the solenoid 55 into engagement with the teeth of the gear segment 43 on the field-frame. The particular construction of the solenoid with its movable contact and the catch is shown in Fig. 4. As there illustrated a spring 63 may be interposed between the catch 62 and the core of the solenoid, so that if the catch should contact with the end of a tooth on the gear segment 43, the spring 63 will yield so that the contact 56 will still be drawn up against the contacts 57 and 58.

The solenoid 55 is connected with an outside circuit through wires 64 and 65. Fig. 12 shows an arrangement of wiring whereby the solenoid is energized when the means for effecting an emergency stop of the press or other instrumentality unwinding the material is operated. For purposes of illustration the electrical system whereby the press is controlled manually is somewhat simplified, because the system is known and is not our invention. 150 indicates the press-driving motor, the field of which is connected directly across the mains. When the press is running, the armature current flows from the plus main along wire 151, through as much of variable resistance 152 as is in circuit, by movable contact 153 to contact 154, thence by wire 155 to contact 156, thence by bridging contact 157 to contact 158, thence to armature brush 159, and from the other armature brush 160 by wire 161 to the minus main. To stop the press suddenly the push-button 162 is closed. This causes current to pass through the solenoid 163, and thence by wire 164 to the minus main. The consequent lifting of the core of this solenoid breaks a circuit between contacts 165 and 166. This circuit may be traced from wire 167 to wire 168, thence through solenoid 169 to wire 164. The consequent deënergizing of solenoid 169 causes the bridging contact 157 to descend, thus breaking the connection between the armature and the mains. The contact 157 now bridges contacts 170 and 171. This short-circuits the armature, by wires 172 and 173, thus causing the motor to act as a generator driven by the press, whereby the press is stopped suddenly by a dynamic braking action. All of the foregoing is old. We provide a plunger 174, which is depressed by the core of the solenoid 169, and which closes the circuit through the solenoid 55 for applying the dynamic brake to the web roll. We have shown the plunger 174 as provided with a rack 175 which meshes with a pinion carrying a contact arm 176, which is adapted to bridge contacts 177 and 178. When this happens current flows along wires 167, 179 to contact 177, to contact 178, by wire 180 to solenoid 55, and thence by wire 181 to the minus main. A spring 182 may return the rod 174, and a dash pot 183 or other timing device may be employed to slow up the movement, so that the circuit is completed across contacts 177 and 178 for a sufficient period of time to maintain the dynamic brake on the paper roll as long as is necessary.

In accordance with the invention means are provided for assisting the braking effect of the generator in stopping the roll when the press is stopped, in event either of an ordinary stopping of the press or an emergency stop. Preferably, this electro-magnetic brake is energized by current taken from the armature of the braking generator. This magnetic brake may be applied to any suitable part connected with the paper roll; but best results are secured by causing it to act upon a part which is rotated at comparatively high speed, since in this way a small amount of magnetism will effect a quick stopping. In the particular construction illustrated a fixed magnet 81 is wound with coils 82 adapted to be placed in circuit with the armature. This magnet is supported by any suitable means, such as indicated at 83, on a stationary supporting part of the frame-work 8. It coöperates with an armature 84 secured to the face of the pinion 31. This armature 84 is movable toward and from the magnet, to which end it may be secured to the pinion by means of screws 85, which permit limited movement of the armature. A spring-actuated device 86, preferably mounted on the magnet, is provided for separating the armature from the magnet when the current through the coils is broken; so that residual magnetism cannot hold the pinion to the magnet to tear the paper web upon again starting the roll. Since the magnet 81 is energized by current from the armature of the generator, its effect will be greater when the dynamic brake effect is secured to produce an emergency stop, than at ordinary stopping. In other words, the reduction in the resistance in circuit with the armature and the locking of the field-frame not only causes the generator to act as a dynamic brake, but the increase of current also causes the magnetic brake 81 to exert an abnormally strong attraction for the armature 84.

The particular wiring in connection with the electro-magnetic brake is shown in Figs. 9 and 12. 87 is a circuit-controlling magnet which is energized when either the emergency press-stopping circuit or the ordinary press-stopping circuit is closed. In other words, the magnetic brake is controlled in an indirect manual manner. The armature current of the generator normally enters at contact 88, passes through the spring contact member 91, thence to contact 92 on the armature member 89, and out at the contact 90 to the rheostat. When the armature member 89 is drawn over by the magnet 87, it separates the contacts 91 and 92 and closes the contacts 92 and 93. The armature circuit now passes from terminal 88 along the wire 94 to the coils of the brake magnet 81, thence by wire 95 to contact 93, thence by contact 92 and the armature member 89 to the rheostat. The contact members 91 and 93 are both preferably spring yielding members, so arranged that the contact 92 must be in contact with both of them in the act of changing from one contact to the other. This obviates interruption of the current through the armature. The construction and operation of these parts will be readily understood from reference to Fig. 9. The contact 91 is a spring blade, while the contact 93 is mounted on a slidable rod which is urged forward by a spring coiled about it. When the contact 92 is moved to the left the contact 93 follows it by virtue of its coiled spring and remains in touch with contact 92 until the latter comes against contact 91. Further movement of contact 92 to the left moves it away from contact 93, which is held against further following movement by an enlargement or stop on the rear end of its rod.

The wiring whereby the controlling magnet 87 is energized by the push-buttons which effect the stopping of the press may be widely varied. In Fig. 12 we have shown an arrangement. The controlling magnet 87 has two coils 96 and 97. 96 is connected in parallel with the solenoid 55 across the wires 180 and 181, so that this coil is energized simultaneously with an emergency stop of the press, to cause current to flow through the braking magnet 81. The magnet is also energized to the same end when the press is slowed down or brought to a gradual stop, for which purpose a push-button 195 is operated. Current then flows from the plus main by wire 98, switch 195, wire 99, to the other coil 97, and thence by wire 181 to the minus main. The system for slowing down or gradually stopping the press is not our invention and is well known. We have therefore illustrated it in a somewhat simplified manner. When the push-button 195 is operated, current flows along wire 98, wire 100, through solenoid 101, to wire 164, and thence to the minus side of the system. Energizing the solenoid 161 causes the contact 153 to move to cut an increasing amount of resistance into the armature circuit of the press motor 150, thus gradually slowing down the press. Eventually the movement of contact 153 breaks the armature circuit. The resistance may be cut out of the armature circuit by operating the push-button 102, thereby energizing a magnet 103, which releases a dog 104 that engages automatically with teeth on the stem of the contact 153.

In accordance with the invention means are provided for securing or locking the field-frame against return to normal position, when a predetermined point in its turning under the torque of the armature has been reached. This point corresponds to a speed due to a very small roll, which would offer so much resistance to the pull of the paper web that the latter might be torn were the braking current to reach maximum strength after again starting the press. The means for latching or preventing the return of the field-frame may be widely varied. In the particular construction illustrated a plate 105 is secured to one end of the field-frame, and a pin 106 projects from this plate in position to ride over a pivoted latch 107, which falls behind the pin, so that while the field-frame may continue its rotation, it cannot return past the point determined by the latch. Means are provided whereby the release of this latch is necessitated by the act of replacing an exhausted roll by a new one. Such means may be widely varied. We have shown a rod 108 mounted slidably in guides 109 on the support 8, for releasing or removing the latch from detaining position with respect to the pin 106. Preferably the latch is pivotally mounted on a head at the upper end of this rod. A spring 110 serves to hold the latch yieldingly in the path of the pin. Raising of the rod 108 lifts the latch 107 out of the path of the pin 106, so that the field-frame is free to return to normal position. The rod 108 may be raised by any suitable means dependent upon the replacement of the paper roll; and for this purpose we may make use of a spring 110$^a$. We have shown the removal of the latch from detaining position as being controlled by the hand-lever 32, which locks the brake mechanism as a whole to the side of the press. It is necessary to move this lever to unlock the mechanism from the press, so that the support 8 may be swung outward, in order to permit the removal of the old spindle and the insertion of a new roll. The spring 110 is placed under compression by the lever 32 when the latter is in its latched position. To this end we may pivot the lower end of the rod 108 to an arm 111, which is pivoted at 112 to the support 8. A link 113 is pivoted at its upper end to the lever 32, and its lower end has a slot 114 receiving a pin 115 projecting from the arm. When the lever 32 is raised, either manually or by the spring 32$^a$, the link 113, which formerly held the arm 111 down against the action of the spring 110, permits the arm and the rod 108 to rise under the action of this spring.

Means are also provided whereby the field-frame must be positively returned to normal position in order to replace the paper roll. This is desirable, inasmuch as the weight 70 acting upon the portion of the cam 71 of the smallest diameter might not be able to effect the return of the field-frame at this time. The means may be widely varied. In the particular construction illustrated we have shown a second pin or projection 116 on the plate 105, this pin being in position to clear the latch 107, but to be contacted and pushed by the head on the end of the rod 108, when this rod rises. Thus, a positive impulse is imparted to the field-frame to return it to normal position.

Means are provided whereby the press is automatically stopped when the roll has diminished in size to a predetermined degree; so that the web cannot become entirely exhausted. Such means may be widely varied, and either electrical or mechanical instrumentalities may be employed. In the particular form of means illustrated we employ a centrifugal governor 200 driven by the roll. This governor is shown mounted on the gear 30. Its pivoted arms 201 fly out at a predetermined speed against the tension of the spring 202 and grip a rotatable incasing member 203, turning the latter. A sliding contact member 204 is connected to this member 203, and has an insulating portion normally interposed between contacts 205 and 206, as shown in Fig. 11. When the contact member is moved downward the conducting portion thereof is brought between the contacts 205 and 206, and a circuit is completed through the solenoid 163 to stop the press. A spring 207 returns the member 203 to normal position. The governor is set so that at a predetermined speed, corresponding to a predetermined size of the roll, the press or other driving means is stopped.

The invention also relates to novel means for regulating the margins of the web, so as to keep the web running true with equal margins at both sides (described and claimed in our copending application Serial Number 3591, filed January 21, 1915, for margin regulating mechanism for web rolls). For this purpose we employ the slidable shaft section 17. This shaft section may be moved longitudinally, so as to shift the roll spindle through the connection of the clutch 14, either by mechanical or by electrical means. We prefer to combine both. In the particular construction illustrated a shifting lever 123 engages with a collar 124 on the shaft section. At its rear end the lever is pivoted by means of a slot on a suitable pin 125, and at its front end it is pivoted to a nut 126 mounted on a screw 127. This screw is journaled at its ends in suitable bearings 128, and carries a bevel gear 129. With this gear mesh two other bevel gears 130 and 131. Gear 130 is mounted on a hand-wheel 132 whereby the margin-shifting may be effected manually by mechanical means. For operating the margin-regulating mechanism electrically we employ a suitable motor 133, and means for causing the armature of the motor to run in either direction. A worm 134 is mounted on the end of the shaft of the armature of this motor, and meshes with a worm-wheel 135, which is mounted on the same shaft as the bevel gear 131. Preferably this worm-wheel is mounted loosely on its shaft 136 and is yieldingly coupled therewith by a spring 137, which forces the wheel down upon a friction surface member 138 secured to the shaft. This frictional slip connection between the margin-regulating motor 133 and the shaft member 17 is a desirable detail, because it permits relative slipping between the shaft 136 and the armature of the motor, even when the spindle has been shifted by the motor as far as is possible, or when the spindle is shifted by the hand-wheel 132.

Figs. 9 and 9ª indicate a form of wiring for causing the armature of the margin-regulating motor to turn in either direction. Wires 138 and 139 connect the field coils with the terminals $g$ and $j$ on the terminal block, conductors 140 and 141 connect the armature brushes with the terminals $h$ and $i$. When the switches L and R are in the positions shown, no current passes through the motor, which is idle. When the switch L is moved against the contact 142, the current passes from the plus line wire, and wire 143, to wire 138, through the field coils, to wire 139, to wires 144 and 145, to contact 142, thence through the blade of the switch to terminal $i$, thence by wire 140 to the armature, thence by wire 141 to terminal $h$, and thence by wire 146, switch R and wire 147 to the minus line wire. With the switch L in the position shown and the switch R in contact with 148, the current passes as before through the field coils, but is reversed through the armature, so that the armature turns in the opposite direction.

In Fig. 9ª a switch 143ª is shown inserted in the conductor 143. This switch is normally closed, and when opened shuts off the current from all the instrumentalities supplied from the terminal block 50.

The operation will be briefly summarized as follows; Let it be assumed that the support 8 is locked against the side of the press-frame, that the press and the paper roll spindle are at rest, and that the paper roll is exhausted. In order to place a new roll in the press, the latch 32ᵇ which holds the lever 32 in its locking position with relation to the press-frame is released, and the spring 32ª which actuates the lever 32 throws the lever quickly to unlocking position. This act throws open the switch 35, thus breaking the circuit through the coils of the magnetic clutch 14. As a matter of fact, this switch preferably breaks all of the circuits which are supplied from the line wires indicated in Fig. 9. The movement of the lever 32 to unlocking position also removes the latch 107 from retaining position with reference to the field-frame, so that the latter may be turned back to normal position in the manner described. The support 8 is now swung away from the press frame, and the old spindle is taken out and a new roll with a new spindle is placed on the bearing 2. The support 8 is swung back against the press, and the lever 32 is caused to lock the mechanism as a whole in operative position. When the lever is forced down and held in locking position by the latch 32ᵇ the switch 35 is closed, so that the magnetic clutch 14 is energized. The web is threaded into the press and the latter is started. The roll begins to unwind, slowly at first and with increasing speed until the press is running at its normal speed. While the press is getting up to normal speed the generator driven from the paper roll is producing current. The field-frame may commence to turn under the torque of the armature even before the press has reached normal speed, so as to cut resistance into the armature circuit. However, the first resistance elements are of so low a value that the armature current increases in strength approximately to the time when the web attains normal lineal velocity. Thereafter, the coaction of the weight 70, the cam 71 and the rheostat 40 is such that more and more resistance is cut into the armature circuit as the speed of the armature increases, due to the diminishing size of the roll, in such manner that the strength of the braking current is progressively decreased. In this way the braking effect of the generator is diminished as the roll diminishes in size. The coaction of the cam and the variable resistance is such that the torque of the armature cannot throw the field-frame over at once. The opposing efforts of the armature and of the weight bear always such relations that the field-frame is turned gradually.

Since the variation in the braking resistance of the generator is under the control of the angular velocity of the paper roll it follows that the braking effect is again increased when the paper roll is slowed down, due to the slowing or stopping of the press. Moreover, at the stopping of the press the magnetic brake 81 is brought into action, to insure that the paper roll will not overrun. In event of an emergency stop of the press the armature circuit of the generator is relieved of a considerable amount of the resistance that happens to be in circuit, and the field-frame is locked, so that a considerably increased current is generated, with a consequent dynamic braking effect. This increased current, also, energizes the braking magnet 81 with increasing strength, so that a very quick stopping of the roll is effected. When the armature of the generator has reached a predetermined speed, corresponding to a predetermined diminished size of the paper roll, the latch 107 comes into operation to prevent the field-frame from turning back to normal position in event of stopping of the press. When, however, a new roll is to be inserted, this operation necessitates the release of the field-frame from the detention of the latch 107, and compels the return of the field-frame to normal position. In event that the diminishing size of the roll is disregarded by the attendant and the press is not stopped in time to prevent the exhaustion of the web, the means under the control of the speed of the roll acts automatically to stop the press. From time to time the margin of the web may be regulated, either by means of the hand-wheel 132, or by the motor 133.

While for purposes of illustration we have shown one embodiment and application of our invention, it will be understood that numerous other embodiments and applications are within the scope of the invention. Numerous changes in structure, function and operation, including reversals, are permissible. An apparatus embodying our invention for maintaining an approximately uniform tension on a web or other material being wound or unwound, including a rotary electric machine connected to the rotary support of the roll or the like and a floating member rotatable under the torque of the rotor of the machine to control a variable impedance, may be embodied in a great variety of ways and put to a great variety of uses.

The margin-regulating means shown and described herein is not claimed in this case, but in a divisional application, Serial No. 3,591, filed January 21, 1915.

We claim:

1. In a tension-controlling mechanism, the combination of a rotatable support for a roll of material, a braking electric generator, driving connections other than the material between said support and the generator, and automatic means for varying the braking effect of said generator.

2. In a web tension mechanism, the combination of an axial support for the roll, a braking electric generator, driving connections between said support and the generator whereby the armature of the latter is driven at a constant speed ratio by the former, and automatic means for varying the braking effect of said generator.

3. In a web tension mechanism, the combination of a braking electric generator, means for connecting the same with the web roll, and means controlled by the angular velocity of the roll for varying the braking effect of said generator.

4. In a tension-controlling mechanism, the combination with an axial support for a roll of material, of a braking electric generator and means whereby the armature thereof is driven at constant speed ratio by said support, and means controlled by the angular velocity of the roll for varying the braking effect of said generator.

5. In a web tension mechanism, the combination of an axial web roll support, a braking electric generator, means for connecting the same with said support so as to be driven at constant ratio thereby, and means controlled by the increasing angular velocity of the roll for diminishing the braking effect of the generator in accordance with the diminishing size of the roll.

6. In a web tension mechanism, the combination of an axial web roll support, a braking electric generator, a clutch for connecting the same with said support, and automatic means for diminishing the braking effect of the generator as the web roll is unwound.

7. In a tension-controlling mechanism, the combination of a rotary support for a roll of material, a braking electric generator, a clutch for connecting the same with said support, and automatic means whereby the braking effect first increases to a maximum and then diminishes in accordance with the diminishing size of the roll.

8. In a web tension mechanism, the combination of a braking electric generator, means for connecting the same with the web roll, and means controlled by the angular velocity of the roll whereby the braking effect of the generator first increases to a maximum and then diminishes as the web is unwound from the roll.

9. In a tension-controlling mechanism, the combination of a rotatable support for a roll of material, electro-magnetic braking means constantly acting on said support during the movement of the material, and means controlled by the angular velocity of the roll for varying the braking effect of said means.

10. In a web tension mechanism, the combination of means for supporting the web roll, electro-magnetic braking means constantly acting on said roll during the unwinding thereof, and means controlled by the angular velocity of the roll for varying the braking effect of said means.

11. In a tension-controlling mechanism, the combination of a braking electric generator, means for supporting a roll of material, means for connecting the generator with the roll, automatic means for varying the braking effect of the generator as the roll changes in size, an electro-magnetic brake for stopping the roll, means for actuating the said brake, and means for varying the strength of the braking action thereof in accordance with the size of the roll.

12. In a web tension mechanism, the combination of a braking electric generator, means for connecting the same with the web roll, a variable impedance, and means controlled by the angular velocity of the roll for varying said impedance so as to vary the braking effect of said generator.

13. In a tension-controlling mechanism, the combination of a rotatable axial support for a roll of material, a braking electric generator and means whereby the same is driven at constant speed ratio by said support, a variable electric resistance, and means controlled by the changing angular velocity of the roll for varying the braking effect of said generator.

14. In a web tension mechanism, the combination of a spindle for supporting the roll, a braking electric generator driven by said spindle, and automatic means for varying the braking effect of said generator.

15. In a tension-controlling mechanism, the combination of a rotatable axial support for a roll of material, a braking electric generator driven by said support, and means controlled by the changing velocity of the support for varying the braking effect of said generator.

16. In a tension-controlling mechanism, the combination of a rotatable support for a roll of material, a braking electric generator including rotatable magnetic means moved by the torque of the rotor of said generator, and means operated by said rotatable magnetic means for varying the braking effect of said generator.

17. In a web tension mechanism, the combination of a braking electric generator, means for connecting the same with the web roll, and means including a rotatable magnetic member moved by the torque of the rotor of said generator for varying the braking effect of said generator as the roll unwinds.

18. In a web tension mechanism, the combination of a braking electric generator, means for driving the same at constant speed ratio from the web roll, said generator including a member rotatable under the torque of its rotor, and means controlled by said member for varying the braking effect of said generator.

19. In a tension-controlling mechanism, the combination with an axial support for a roll of material, of a braking electric generator, a clutch for connecting said generator with said support, said generator including a member rotatable under the torque of its rotor, and means operated by said member to vary the braking effect of the generator.

20. In a web tension mechanism, a braking electric generator, means for connecting the same with the web roll, said generator having a rotatable member moved by the torque of its rotor, means for offering diminishing opposition to the turning of said member, and means operated by said member for varying the braking effect of the generator.

21. In a web tension mechanism, a braking electric generator, means for connecting the same with the web roll, said generator having a rotatable member moved by the torque of its rotor, mechanical means for exerting a diminishing effort to turn said member in the contrary direction, and means operated by said member for varying the braking effect of the generator.

22. In a web tension mechanism, a braking electric generator, means for connecting the same with the web roll, said generator having a rotatable member moved by the torque of its rotor, means for exerting a changing effort to turn said member in the contrary direction, a variable impedance, and means whereby said member controls said impedance to vary the braking effect of the generator.

23. In a web tension mechanism, a rotatable support for a roll of material, a braking electric generator having a rotatable member moved by the torque of its rotor, means for exerting a changing effort to turn said member in the contrary direction, a variable electric resistance controlled by said member so as to vary the braking effect of the generator, and means for connecting said generator with the roll support.

24. In a web tension mechanism, the combination of a braking electric generator having a floating field-frame means whereby said generator is driven by the web, means for exerting a diminishing opposition to the rotation of said field-frame under the torque of the generator armature, and means controlled by said rotatable field-frame for varying the braking effect of the generator.

25. In a tension-controlling mechanism, the combination of a rotatable support for a roll of material, a braking electric generator having a floating field-frame, a clutch for connecting said generator with said support, means for exerting a changing contrary turning effort on said field-frame, and means controlled by said rotatable field-frame for varying the braking effect of the generator.

26. In a web tension mechanism, the combination of a braking electric generator having a floating field-frame means whereby said generator is driven by the web, means for exerting a diminishing opposition to the rotation of said field-frame under the torque of the generator armature, and a variable impedance controlled by said rotatable field-frame and connected with the generator so as to vary the braking effect thereof.

27. In a web tension mechanism, the combination of a braking electric generator having a member rotatable under the torque of its armature, means whereby the generator is driven by the web, a weight controlling the movement of said member, a variable electrical resistance connected with the generator for varying the braking effect thereof, and means whereby said resistance is varied by said rotatable member.

28. In a web tension mechanism, the combination of a braking electric generator having a member rotatable under the torque of its armature, means whereby the generator is driven by the web, mechanical means for exerting a torque on said member contrary to the torque of the armature, means whereby the torque of said mechanical means is progressively diminished, a variable electrical resistance connected with the generator, and means whereby said resistance is controlled by said member so as to diminish the braking current as the speed of the generator armature increases.

29. In a tension-controlling mechanism, the combination of means for supporting a roll of material, a braking electric generator having a member rotatable under the torque of its armature, means whereby the generator is driven by the roll, a weight opposing such movement of said member, a cam for automatically varying the leverage of said weight, a variable impedance connected with the generator, and means whereby said impedance is controlled by said member to vary the braking effect of the generator.

30. In a web tension mechanism, the combination of a braking electric generator having a member rotatable under the torque of its armature, means whereby the generator is driven by the web, mechanical means for exerting a torque on said member contrary to the torque of the armature, a cam driven by said member for varying the moment of said means, a variable impedance connected with the generator, and means whereby said impedance is controlled by said member to vary the braking effect of the generator.

31. In a web tension mechanism, the combination of a braking electric generator having a member rotatable under the torque of its armature, means whereby the generator is driven by the web, returning means for exerting a contrary torque on said member decreasing as the member is rotated by the torque of the armature, means for adjusting the torque of said returning means at will, and a variable electrical resistance connected with the generator and controlled by said member to diminish the braking effect of the generator as the speed of the armature increases.

32. In a tension-controlling mechanism, the combination of means for supporting a roll of material, a braking electric generator having a member rotatable under the torque of its armature, means whereby the generator is driven by the material, an adjustable weight controlling the movement of said member, and a variable electrical resistance connected with the generator and controlled by said member to vary the braking effect of the generator.

33. In a web tension mechanism, the combination of a braking electric generator having a member rotatable under the torque of its armature, means whereby the generator is driven by the web, a cam connected with said member, a weight and a flexible connector suspending the same from the cam, and a variable impedance controlled by said member for varying the braking current produced by the generator.

34. In a tension mechanism, the combination of a rotatable support for a roll of material, a braking electric generator driven by said support and having a member rotatable under the torque of its armature, a weight slidably mounted on a pivoted arm, a cam connected with said member, a flexible connector connecting the cam and the arm, and a variable electrical resistance controlled by said member for varying the braking current produced by the generator.

35. In a web tension apparatus, the combination of a rotatable support for the web roll, a braking electric generator driven thereby and having a member rotatable under the torque of its rotor, mechanical means for opposing such rotation of said member, said means being adapted to have decreasing effect as the said member is so turned, and a variable impedance controlled by said member while turning to vary the braking current.

36. In a web tension apparatus, the combination of a rotatable member driven by the web, a braking electric generator, clutch connection between the generator and said member, a variable resistance in circuit with the armature of said generator, and automatic means for varying said resistance as the web roll unwinds.

37. In a web tension apparatus, the combination of a braking electric generator, means for connecting the same with the web roll, a variable resistance in circuit with the armature of said generator, and means controlled by the angular velocity of the web roll for varying said resistance.

38. In a tension apparatus, the combination of means for supporting a roll of material, a braking electric generator, means whereby the same is driven from said supporting means, said generator having a member rotatable under the torque of its armature, and a variable electrical resistance in series with the armature controlled by said member.

39. In a tension apparatus, the combination of means for supporting a roll of material, a braking electric generator, means whereby the same is driven from said supporting means, said generator having a member rotatable under the torque of its armature, means for exerting a diminishing contrary torque on said member as it turns under the torque of the armature, a variable electrical resistance in circuit with the armature, and means whereby said member in rotating under the torque of the armature cuts in increasing resistance.

40. In tension apparatus, means for supporting a roll of material, a braking electric generator, means whereby the same is driven from the material, a variable resistance for varying the braking effect of the generator, automatic means for controlling said resistance in accordance with the changing size of the roll, and means for cutting out a considerable amount of the resistance so as to effect a quick stopping of the roll.

41. In a web tension apparatus, a braking electric generator, means whereby the same is driven by the web, a variable resistance for varying the braking effect of the generator, automatic means for controlling said resistance in accordance with the unwinding of the web, and means for materially altering the amount of resistance affecting the generator to produce a dynamic braking effect.

42. In a printing press, a braking electric generator, means for connecting the same with the web-roll, a variable electrical resistance for varying the braking effect of the generator, automatic means for varying said resistance as the roll diminishes in size, emergency means for stopping the press, and means controlled by said emergency means for materially altering the amount of resistance affecting the generator so as to produce a dynamic braking effect.

43. In a tension apparatus, means for supporting a roll of material, means for driving the material, a braking electric generator driven from the material, a variable impedance for varying the braking effect of the generator, automatic means for varying said impedance as the roll revolves, means for stopping the means for driving the material, and means controlled by this stopping means for materially altering the amount of impedance affecting the generator so as to produce a dynamic braking effect.

44. In a tension apparatus, means for supporting a roll of material, a braking electric generator, means whereby the same is driven from the material, a variable resistance for varying the braking effect of the generator, said generator having a floating field, means whereby said field controls said resistance and means for simultaneously locking said field-frame and materially altering the amount of resistance affecting the generator.

45. In a tension apparatus, means for supporting a roll of material, a braking electric generator, means whereby the same is driven from the material, a circuit with a variable resistance for varying the current produced by the generator, two contact members coöperating with the variable resistance, one being normally in closed circuit and the other normally in open circuit, and emergency means for changing the circuit to include the second contact member so as to materially change the amount of resistance affecting the generator.

46. In a web tension apparatus, a braking electric generator, means for connecting the same with the web roll, said generator having a floating field, a circuit with a variable resistance for varying the braking effect of the generator, two contact members coöperating with the contacts of the resistance sections, means whereby said field-frame produces relative movement between the contacts of the resistance sections and the contact members, and emergency means for simultaneously locking said field-frame with the contacts and contact members and for changing the circuit to include the second contact member so as to materially change the amount of resistance affecting the generator.

47. In an apparatus for controlling web rolls, a braking electric generator, means for connecting the same with the web roll, automatic means for varying the braking effect of said generator as the roll unwinds, and an electro-magnetic brake for assisting in stopping the roll.

48. In a tension apparatus, means for supporting a roll of material, a braking electric generator, means for connecting the same with the roll, automatic means for varying the strength of current produced by said generator as the roll revolves, an electro-magnetic brake for assisting in stopping the roll, and means whereby said brake is energized by current from said generator.

49. In a printing press, a braking electric generator, means for connecting the same with the paper roll, automatic means for varying the braking effect of said generator as the roll unwinds, an electro-magnetic brake for assisting in stopping the roll, means for stopping the press, and means controlled thereby for completing the circuit through the coils of said electro-magnetic brake.

50. In a printing press, a braking electric generator, means for connecting the same with the paper roll, automatic means for varying the strength of current produced by said generator as the roll unwinds, an electro-magnetic brake for assisting in stopping the roll, means for stopping the press, and means controlled thereby for causing said brake to be energized by current from said generator.

51. In an apparatus for controlling rolls of material, a braking electric generator, means for connecting the same with the roll, automatic means for varying the braking effect of said generator as the roll revolves, a fixed electro-magnetic brake, a rotatable armature therefor connected with the roll, and means for energizing said brake to assist in stopping the roll.

52. In an apparatus for controlling rolls of material, a braking electric generator, means for connecting the same with the roll, automatic means for varying the braking effect of said generator as the roll revolves, a fixed electro-magnetic brake, a plate armature mounted loosely on a rotatable support connected with the roll so as to be movable toward and from the electro-magnetic brake, and spring means for separating the magnet and armature.

53. In an apparatus for controlling rolls of material, a braking electric generator, means for connecting the same with the roll, a circuit including a veriable resistance for varying the current produced by the generator, automatic means for controlling said variable resistance to decrease the braking current as the roll revolves, stopping means for materially altering the amount of resistance affecting the generator so as to increase the braking current, a normally deënergized electro-magnetic brake, and means whereby it is supplied with current from said generator upon the operation of said stopping means.

54. In a web tension apparatus, a braking electric generator, means whereby the same is driven by the web, said generator including a floating member rotated by the torque of its armature, means whereby said member in so turning decreases the braking effect of the generator, means for exerting a diminishing contrary turning effect on said member when the latter is rotated by the armature, and means for preventing said member from returning to normal position after turning to a predetermined degree.

55. In a tension apparatus, a braking electric generator, means whereby the same is driven from the material under tension, said generator including a floating member rotated by the torque of its armature, means whereby said member in so turning decreases the braking effect of the generator, means for exerting a diminishing contrary turning effect on said member when the latter is rotated by the armature, and an automatic latch coöperating with said member at a predetermined degree of rotation.

56. In a tension apparatus, means for receiving a rotary axial support for a roll of material, a braking electric generator, means whereby the same is driven by said rotary support, means for automatically varying the braking effect of said generator including a floating member rotatable under the torque of the armature of the generator, means for preventing said member from returning to normal position after turning to a predetermined degree, and means whereby replacement of the rotary support necessitates the return of said member to normal position.

57. In a web tension apparatus, means for receiving the web roll, a braking electric generator, means whereby the same is driven by the web, means for automatically varying the braking effect of said generator including a floating member rotatable under the torque of the armature of the generator and means tending to return the member to normal position, an automatic latch coöperating with said member at a predetermined degree of rotation, and means whereby replacement of the roll necessitates the release of said member from the detention of said latch.

58. In a web tension apparatus, means for receiving the web roll, a braking electric generator and means whereby the same is driven by the web, means for automatically varying the braking effect of said generator including a floating member rotatable under the torque of the armature of the generator, and means whereby replacement of the roll compels the return of said member to normal position.

59. In a web tension apparatus, means for receiving the web roll, a braking electric generator and means whereby the same is driven by the web, means for automatically varying the braking effect of said generator including a floating member rotatable under the torque of the armature of the generator and means for exerting a diminishing contrary turning effect on the member during such turning, means for imparting a returning impulse to said member, and means whereby the replacement of the roll occasions the actuation of the last-named means.

60. In a web tension apparatus, a roll spindle, a braking electric generator, a clutch for connecting the same with the spindle, means for automatically varying the braking effect of the generator including a floating member rotatable under the torque of the armature of the generator, means for preventing said member from returning to normal position after turning to a predetermined degree, and means whereby disconnection of said clutch necessitates the return of said member to normal position.

61. In a tension apparatus, means for receiving a rotatable axial support for a roll of material, a braking electric generator, a clutch for connecting the same with said support, means for automatically varying the braking effect of the generator including a floating member rotatable under the torque of the armature of the generator, and means whereby disconnection of said clutch necessitates the return of said member to normal position.

62. In a web tension apparatus, a frame for receiving the web roll, a supporting structure movable toward and from said frame, a braking electric generator mounted on said supporting structure, means whereby said generator is driven by the roll, means for automatically varying the braking effect of said generator including a floating member rotatable under the torque of the armature of the generator, means for preventing said member from returning to normal position after turning to a predetermined degree, and means whereby moving said supporting structure away from said frame necessitates the release of said member from the detention of the last-named means.

63. In a web tension apparatus, a frame for receiving the web roll, a supporting structure movable toward and from said frame, a braking electric generator mounted on said supporting structure, means whereby said generator is driven by the roll, means for automatically varying the braking effect of said generator including a floating member rotatable under the torque of the armature of the generator, means for exerting a returning effort on said member, and means whereby moving said support away from said frame necesistates the actuation of the last-named means.

64. In a tension apparatus, means for receiving a rotary support for a roll of material, a braking electric generator, means whereby the same is driven by the roll, means for automatically varying the braking effect of said generator including a floating member rotatable under the torque of the armature of the generator and means for exerting a diminishing contrary turning effect on the member during such turning, means for preventing said member from returning to normal position after turning to a predetermined degree, means for exerting a returning effort on said member, and means whereby replacement of the roll support necessitates the release of said member from the detaining means and the actuation of the returning means.

65. In a tension apparatus, a frame for receiving a roll of material, a movable supporting structure, means for locking the same in relation to said frame, a braking electric generator mounted on said supporting structure, means whereby the generator is driven by the roll, means for automatically varying the braking effect of said generator including a floating member rotatable under the torque of the armature of the generator, means from preventing said member from returning to normal position after turning to a predetermined degree, and means whereby unlocking of said locking means necessitates the release of said member from the detention of the last-named means.

66. In a tension apparatus, a frame for receiving a roll of material, a movable supporting structure, means for locking the same in relation to said frame, a braking electric generator mounted on said supporting structure, means whereby the generator is driven by the roll, means for automatically varying the braking effect of said generator including a floating member rotatable under the torque of the armature of the generator, and means whereby unlocking of said locking means necessitates the return of said member to normal position.

67. In a web tension apparatus, the combination with a frame and a rotary web roll support mounted thereon, of a movable supporting structure at one side of the frame, a braking electric generator mounted on the supporting structure, and means including a clutch for connecting said generator with said rotary web roll support.

68. In a tension apparatus, the combination with a frame and a rotary roll support mounted thereon, of a movable supporting structure at one side of the frame, means for locking said supporting structure in relation to the frame, a braking electric generator mounted on the supporting structure, and means including a clutch for connecting said generator with said rotary roll support.

69. In a tension apparatus, the combination with a frame for receiving a roll of material, of a pivoted supporting structure at one side of the frame adapted to be swung toward and from the same, a braking electric generator mounted on the supporting structure, and means for connecting said generator with the roll.

70. In a printing press, the combination with the press frame having means for receiving the paper roll, of a movable supporting structure located at one side of the frame adjacent said means, a braking electric generator mounted on said supporting structure, and means for connecting said generator with the roll spindle.

71. In a web tension apparatus, the combination with a frame for receiving the web roll, of a supporting structure pivoted at one side of the frame to be swung toward and from the same, means for locking the supporting structure in relation to the frame, and means including a clutch for connecting said generator with the web roll.

72. In a printing press, the combination with the press frame and a rotary web roll support mounted thereon, of a movable supporting structure located at one side of the frame adjacent said rotatable support, a braking electric generator mounted on said supporting structure, and means for driving the generator from the web roll including a clutch engaging with said rotatable support.

73. In a tension apparatus, the combination with a frame for receiving a roll of material, of a supporting structure movable toward and from the frame, a braking electric generator mounted on said supporting structure, an electro-magnetic clutch for connecting said generator with the web roll, locking means for holding said supporting structure in relation to the frame, and means whereby unlocking of the said means occasions the deënergizing of said magnetic clutch.

74. In a tension apparatus, the combination with a frame for receiving a rotary support for a roll of material of a braking electric generator, a shaft connected therewith, a clutch member for coupling the shaft with said support, and two universal joints and an interposed shaft section connecting said shaft with said clutch member.

75. In a tension apparatus, the combination with a frame for receiving a rotary support for a roll of material, of a braking electric generator, a shaft connected therewith, a clutch member for coupling the shaft with said support, two universal joints and an interposed shaft section connecting said shaft with said clutch member, and a casing interposed between the shaft and the clutch member and inclosing the last-named parts, said casing comprising two ball and socket joints and a telescopic joint.

76. In a web tension apparatus, the combination with a frame for receiving a rotary support for a roll of material, of a braking electric generator, shafting for connecting said generator with said rotary support and having two universal joints, and a casing for the latter, said casing comprising two end sections secured to the shafting, intermediate sections telescoping on each other and having ball and socket joints with the end sections, and a spring for forcing the intermediate sections apart.

77. In a tension apparatus, a rotary support for the roll or the like, and means for maintaining an approximately uniform tension on the traveling material, comprising a rotary electric machine having driving connections with the roll support, and including a floating member rotated by the torque of the rotor of the machine, and a variable impedance controlled by said floating member.

78. In a tension apparatus, a rotary support for the roll or the like, a rotary electric machine having driving connections with the roll support, and including a floating member rotated by the torque of the rotor of the machine, means for exerting a changing contrary turning effect on the floating member, the movement of the floating member being controlled by the opposing efforts of the torque and of said means and the said means acting to return the floating member to or toward normal position when the torque of the rotor fails or diminishes, and a variable impedance controlled by said floating member.

In testimony whereof we have signed our names to this specification, in the presence of two subscribing witnesses.

GLENN S. WILLIAMSON.
CHARLES E. MANDELICK.

Witnesses:
C. F. BRANDENBURG,
LOUELLA F. LITTLE.